United States Patent
Alanazi et al.

(10) Patent No.: US 11,906,951 B2
(45) Date of Patent: Feb. 20, 2024

(54) METHOD AND SYSTEM FOR MANAGING MODEL UPDATES FOR PROCESS MODELS

(71) Applicant: SAUDI ARABIAN OIL COMPANY, Dhahran (SA)

(72) Inventors: Mohammed K Alanazi, Dhahran (SA); Talal A. Altook, Khobar (SA); Gabriel Winter, Dhahran (SA); Abdulaziz M Alnutaifi, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 164 days.

(21) Appl. No.: 17/477,076

(22) Filed: Sep. 16, 2021

(65) Prior Publication Data
US 2023/0080357 A1   Mar. 16, 2023

(51) Int. Cl.
G05B 19/418   (2006.01)

(52) U.S. Cl.
CPC ............... *G05B 19/41885* (2013.01); *G05B 2219/32128* (2013.01); *G05B 2219/32335* (2013.01); *G05B 2219/35499* (2013.01)

(58) Field of Classification Search
CPC .... G05B 19/41885; G05B 2219/32128; G05B 2219/32335; G05B 2219/35499; G05B 19/4183
USPC ......................................................... 700/276
See application file for complete search history.

(56) References Cited

U.S. PATENT DOCUMENTS

| | | |
|---|---|---|
| 9,904,268 B2 | 2/2018 | Blevins et al. |
| 9,904,746 B2 | 2/2018 | McKim et al. |
| 2007/0106399 A1 | 5/2007 | Korchinski |
| 2007/0192078 A1 | 8/2007 | Nasle et al. |
| 2016/0260041 A1 | 9/2016 | Horn et al. |
| 2016/0365735 A1 | 12/2016 | Raczynski et al. |

(Continued)

FOREIGN PATENT DOCUMENTS

| | | |
|---|---|---|
| CN | 101158872 B | 12/2013 |
| CN | 103699723 A | 4/2014 |

(Continued)

OTHER PUBLICATIONS

International Search Report and Written Opinion of the International Searching Authority issued in corresponding International Application No. PCT/US2022/043824, dated Dec. 22, 2022 (13 pages).

*Primary Examiner* — Thomas C Lee
*Assistant Examiner* — Michael Tang
(74) *Attorney, Agent, or Firm* — Osha Bergman Watanabe & Burton LLP

(57) ABSTRACT

A method may include obtaining acquired process data regarding a plant process that is performed by a plant system. The method may further include obtaining from a process model, simulated process data regarding the plant process. The method may further include determining drift data for the process model based on a difference between the acquired process data and the simulated process data. The drift data may correspond to an amount of model drift associated with the process model. The method may further include determining whether the drift data satisfies a predetermined criterion. The method further includes determining, in response to determining that the drift data fails to satisfy the predetermined criterion, a model update for the process model.

14 Claims, 6 Drawing Sheets

(56) References Cited

U.S. PATENT DOCUMENTS

| | | | |
|---|---|---|---|
| 2016/0371405 A1 | 12/2016 | Raczynski et al. | |
| 2017/0285221 A1* | 10/2017 | Kayode | G01V 99/005 |
| 2017/0364043 A1 | 12/2017 | Ganti et al. | |
| 2018/0254109 A1 | 9/2018 | Cheatham, III et al. | |
| 2019/0072942 A1* | 3/2019 | Park | G05B 13/048 |
| 2019/0196425 A1 | 6/2019 | Cheng | |
| 2020/0379424 A1 | 12/2020 | Wang et al. | |
| 2021/0089860 A1* | 3/2021 | Heere | G06N 20/00 |
| 2022/0195318 A1* | 6/2022 | Naito | C10G 45/72 |
| 2022/0413926 A1* | 12/2022 | Ishii | G06F 9/5027 |
| 2023/0016084 A1* | 1/2023 | SayyarRodsari | G05B 23/0254 |

FOREIGN PATENT DOCUMENTS

| | | |
|---|---|---|
| CN | 106446571 A | 2/2017 |
| CN | 109978204 A | 7/2019 |
| CN | 12182996 A | 1/2021 |
| CN | 112761896 A | 5/2021 |
| JP | H06253066 A * | 9/1994 |
| WO | 2020/197533 A1 | 10/2020 |
| WO | 2021/153271 A1 | 8/2021 |

\* cited by examiner

METHOD AND SYSTEM FOR MANAGING MODEL UPDATES FOR PROCESS MODELS

BACKGROUND

Various linear and non-linear processes in a plant may be modeled to determine proper performance, such as desired quality levels of various chemical outputs in a plant operation. However, some plant processes may require a heavy computational burden to model. To reduce this computational burden, various approximation models may provide a substitute to performing the underlying equations. Unfortunately, due to changes in process parameters and equipment over time, the accuracy of an approximation model may drift below a desired accuracy level. Once the approximation model falls below this level, the approximation model may require a model update or a complete replacement of the model.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes obtaining, by a computer processor, acquired process data regarding a plant process that is performed by a plant system. The method further includes obtaining, by the computer processor and from a process model, simulated process data regarding the plant process. The method further includes determining, by the computer processor, drift data for the process model based on a difference between the acquired process data and the simulated process data. The drift data corresponds to an amount of model drift associated with the process model. The method further includes determining, by the computer processor, whether the drift data satisfies a predetermined criterion. The method further includes determining, by the computer processor and in response to determining that the drift data fails to satisfy the predetermined criterion, a model update for the process model.

In general, in one aspect, embodiments relate to a method that includes determining, by a computer processor, that a process model fails to satisfy a predetermined criterion using drift data for a plant process. The method further includes transmitting, by the computer processor, a first request to update the process model. The method further includes determining, by the computer processor, whether the process model has been updated after a predetermined period of time. The method further includes transmitting, by the computer processor and in response to determining that the process model has not been updated within the predetermined period of time, a second request to update the process model. The method further includes determining, by the computer processor and in response to transmitting the second request, a model update for the process model.

In general, in one aspect, embodiments relate to a system that includes a user device and a plant system that includes a process model and plant equipment. The system further includes a model drift manager that includes a computer processor and coupled to the plant system and the user device. The model drift manager obtains acquired process data regarding a plant process that is performed by the plant system. The model drift manager obtains, from the process model, simulated process data regarding the plant process. The model drift manager determines drift data for the process model based on a difference between the acquired process data and the simulated process data. The model drift manager determines whether the drift data satisfies a predetermined criterion. The model drift manager transmits, to the user device and in response to determining that the drift data fails to satisfy the predetermined criterion, a request to update the process model.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
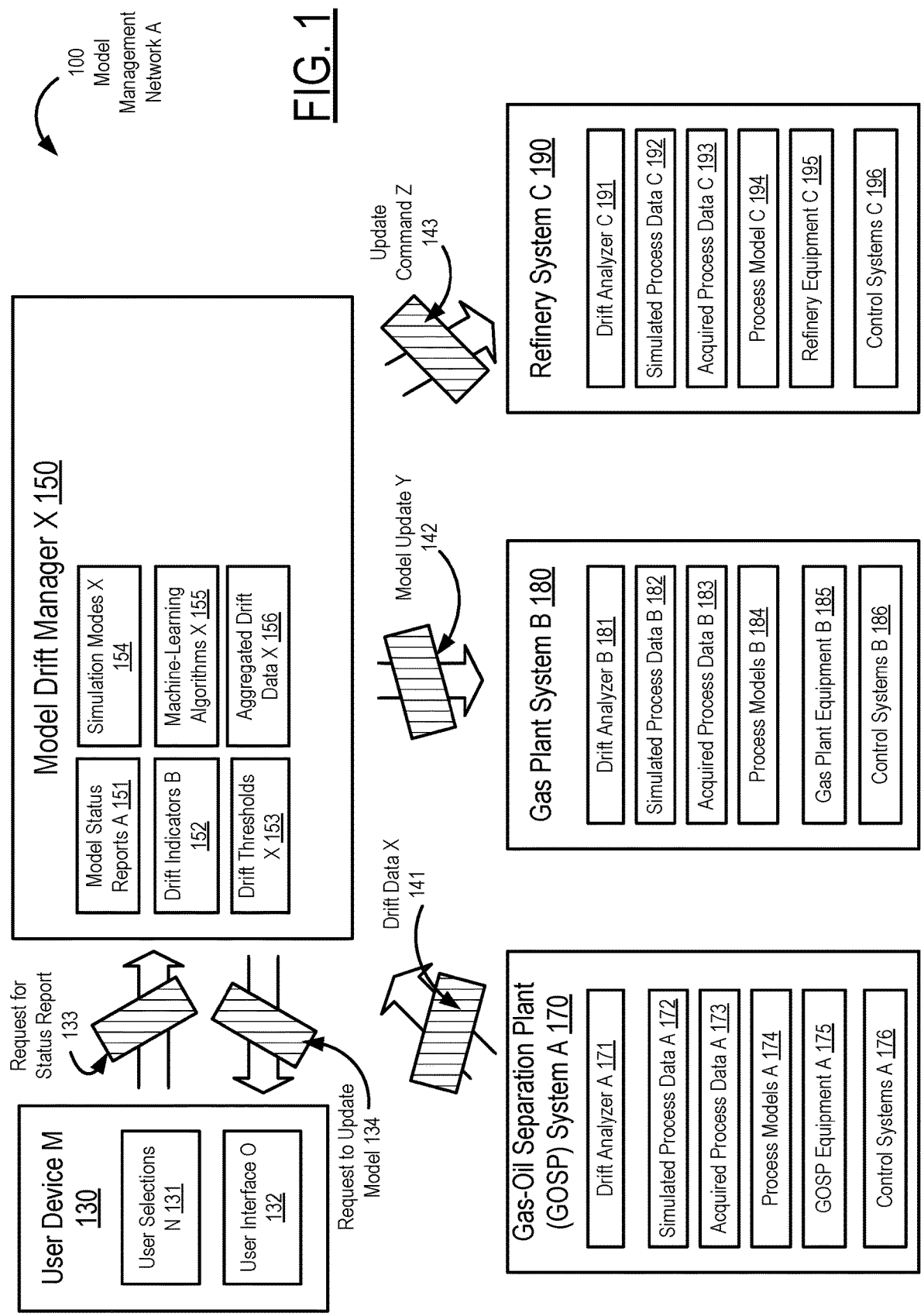
FIG. 1 shows a system in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for determining and/or managing model drift associated with process simulation models that simulate overall gas plant performance. In particular, a process model may simulate one or more plant processes at a plant facility, such as for quality control purposes. However, a process model may experience "model drift" over time, where the process model may gradually lose accuracy in predicting a plant process. Prior to releasing a process model into production, the original process model may have been tuned to represent actual plant operations thereby ensuring a model with accurate decision-making capability. Once released into plant service, however, some models may lose their fit to actual plant data for multiple reasons. Causes of model drift may include operational philosophy changes, changes occurring in plant equipment, such as equipment modifications, changing environmental conditions at the plant, and changes in underlying parameters used to implement various plant processes. Thus, some embodiments are directed to detecting and/or resolving model drift issues in a periodic and streamlined approach.

Furthermore, some systems and methods include monitoring key process parameters that depend on a particular plant type (e.g., a gas-oil separation plant (GOSP), a gas plant, or a refinery) in a drift analysis. By comparing expectations from related simulation modes of these identified process parameters with acquired process data, the amount of model drift occurring may be measured for a process model at a respective plant. Through this monitoring process, inaccurate process models may be identified that fail certain minimum model quality criteria (e.g., model drift exceeds a predetermined drift threshold). After identifying that a respective process model no longer matches acquired process data, one or more update workflow(s) may be triggered that operate until the process model is successfully updated.

Some embodiments may include a model drift manager that aggregates drift data for scheduling and/or requesting updates for various process models. Rather than having faulty process models be identified and updated in an ad-hoc fashion, some embodiments may provide an automated and streamlined approach to various update tasks. For example, a central dashboard may present key performance indicators that enable users and automated programs to trigger any desired model updates based on viewing a model drift situation among multiple process models in multiple plants. When a user detects that an important process model is experiencing model drift issues, the process model may be flagged as soon as possible using such as a platform. Likewise, by being aware of different levels of model drift throughout numerous process models, users and automated programs can make update decisions as well as have greater confidence in plant operations that use these process models.

Turning to FIG. 1, FIG. 1 shows a schematic diagram in accordance with one or more embodiments. As shown in FIG. 1, a model management network (e.g., model management network A (100)) may include various plant facilities (e.g., gas-oil separation plant (GOSP) system A (170), gas plant system B (180), refinery system C (190)), one or more model drift managers (e.g., model drift manager X (150)), various user devices (e.g., user device M (130)), and various network elements (not shown). Plant facilities may include plant equipment (e.g., GOSP equipment A (175), gas plant equipment B (185), refinery equipment C (195)) and various control systems (e.g., control systems A (176), control systems B (186), control systems C (196)). In some embodiments, a plant facility includes one or more process models (e.g., process model A (174), process model B (184), process model C (194)) for monitoring and/or managing one or more plant processes, such as chemical processes or petro-chemical processes, being performed at the plant facility. Other examples of plant processes may include gas operations, unconventional resources operations, refining operations, and natural gas liquid (NGL) fractionation. The model management network A (100) may be similar to network (630) described below in FIG. 6 and the accompanying description.

Furthermore, a process model may include functionality for simulating various actual processes by computing or approximation underlying equations corresponding to the actual process. In some embodiments, a process model is generated by matching a process flow diagram (PFD) to acquired process data before delivery of the process model to a respective plant facility. Likewise, a process model may be used to perform various plant applications, such as a sensitivity analysis, analyzing quality control metrics, predictive analytics, and/or real-time optimizations of plant equipment. Examples of process models include physics-based models, linear models, and stochastic models.

In some embodiments, a process model is a surrogate model. More specifically, a surrogate model may be a model that approximates a complete simulation model of one or more processes. As such, a surrogate model may emulate the behavior of a simulation model with less computational costs than the complete simulation model. A surrogate model may use black-box modelling, where the inner working of the surrogate model's software code may not be known or understood. However, an input-output relationship may be known for a particular surrogate model. Furthermore, model surrogates may numerically approximate one or more underlying rigorous process models, e.g., for quality assurance purposes. In some embodiments, surrogate models provide scalability (e.g., integration of hundreds or thousands of process models) for various plant operations by reducing time required for simulation computations.

In some embodiments, a surrogate model is a machine-learning model. Examples of machine-learning models include convolutional neural networks, deep neural networks, recurrent neural networks, support vector machines, decision trees, inductive learning models, deductive learning models, supervised learning models, unsupervised learning models, reinforcement learning models, etc. In some embodiments, two or more different types of machine-learning models are integrated into a single machine-learning architecture, e.g., a machine-learning model may include both decision trees and neural networks.

With respect to artificial neural networks (ANN), an artificial neural network may include one or more hidden layers, where a hidden layer includes one or more neurons. A neuron may be a modelling node or object that is loosely patterned on a neuron of the human brain. In particular, a neuron may combine data inputs with a set of coefficients, i.e., a set of network weights for adjusting the data inputs. These network weights may amplify or reduce the value of a particular data input, thereby assigning an amount of significance to various data inputs for a task being modeled. Through machine learning, an artificial neural network may determine which data inputs should receive greater priority in determining one or more specified outputs of the neural network. Likewise, these weighted data inputs may be summed such that this sum is communicated through a neuron's activation function to other hidden layers within the neural network. As such, the activation function may determine whether and to what extent an output of a neuron progresses to other neurons where the output may be weighted again for use as an input to the next hidden layer.

In some embodiments, various types of machine learning algorithms (e.g., machine-learning algorithms X (155)) are used to train a surrogate model, such as a backpropagation algorithm. In a backpropagation algorithm, gradients are computed for each hidden layer of a neural network in reverse from the layer closest to the output layer proceeding to the layer closest to the input layer. As such, a gradient may be calculated using the transpose of the weights of a respective hidden layer based on an error function (also called a "loss function"). The error function may be based on various criteria, such as mean squared error function, a similarity function, etc., where the error function may be used as a feedback mechanism for tuning weights in the electronic model.

In some embodiments, a machine-learning model is trained using multiple epochs. For example, an epoch may be an iteration of a model through a portion or all of a training dataset. As such, a single machine-learning epoch may correspond to a specific batch of training data, where the training data is divided into multiple batches for multiple epochs. Thus, a machine-learning model may be trained or retrained iteratively using epochs until the model achieves a predetermined level of prediction accuracy. Thus, better training of a surrogate model may lead to better predictions by a trained model.

In some embodiments, a model drift manager includes hardware and/or software with functionality for collecting and/or analyzing drift data regarding multiple process models in a model management network. For example, drift data may be data that describes a difference between simulated process data and acquired process data for a particular process model at a particular plant facility (e.g., drift data X (141) may correspond to a difference between simulated process data A (172) and acquired process data A (173) for one of the process models A (174)). Drift data may be determined using various drift indicators (e.g., drift indicators B (152)) to determine whether a process model satisfies one or more predetermined criteria (e.g., drift thresholds X (153)). In particular, a drift indicator may correspond to a particular output within a plant process that is monitored for changes in quality. For example, one drift indicator in a refining process for a particular type of light crude oil may the resulting amounts of gasoline or diesel fuel. Another drift indicator may be the actual fuel quality of gasoline or diesel fuel produced in the refining process. Thus, different drift indicators may be used for different types of plant processes.

In some embodiments, drift data is based on differences in multiple simulation scenarios for one or more plants processes. The simulation scenarios may be based on one or more simulation modes (e.g., simulation modes X (154)) that describe different sets of parameters that may affect an output of a plant process. In some embodiments, for example, drift data may correspond to one or more key performance indicators (KPIs) that are based on one or more predetermined functions, such as an error function, for analyzing model drift. Likewise, drift data may be weighted data that is used to compute a particular model drift score. As such, different types of model accuracy may be assigned different weights for determining a final model drift score for a process model.

Furthermore, the model drift manager may also include hardware and/or software for managing model updates (e.g., model update Y (142)) among various process models based on drift data. For example, a model drift manager may administer an update schedule by determining when a process model may become outdated and/or allocating resources for different models. For example, a surrogate model for a very important manufacturing process may be pushed early in an update queue when the surrogate model slightly exceeds a required accuracy threshold. On the other hand, one or more surrogate models experience more model drift may be placed lower in an update queue or update schedule depending on their respective importance to production. Likewise, the model drift manager may identify in model status reports (e.g., model status reports A (151)) which models may require attention based on measured drift changes and/or predictions of future drift changes. Thus, the model drift manager may collect information regarding drift in plant process quality, e.g., to optimize model building practices and resolve repeated issues among process models in various plants.

In some embodiments, one or more drift analyzers (e.g., drift analyzer A (171), drift analyzer B (181), drift analyzer C (191)) are disposed in a model management network. In particular, a drift analyzer may include hardware and/or software with functionality for determining drift data based on one or more key performance indicators (KPIs) for a respective process model. For example, a drift analyzer may be coupled to a corresponding process model and determine a specific model quality KPI based on one or more process outputs. As such, drift data may be a function of one or more observed changes in various simulation values among output parameters in comparison to acquired process data. In some embodiments, the drift analyzer may determine a model quality score based on a predetermined scoring function. After determining drift data, the drift analyzer may transmit the drift data to a central repository, e.g., a model drift manager, for further processing.

In some embodiments, drift data are presented in one or more user interfaces (e.g., user interface O (132) in user device M (130)). For example, a model drift manager may aggregate and present drift data (e.g., aggregated drift data X (156)) from different process models into a central unified dashboard, e.g., in a graphical user interface where drift values for different process models are cascaded. Using a graphical user interface, for example, a user may provide one or more user selections (e.g., user selections N (131) in user device M (130)) regarding a sequence of model updates based on the drift data. Likewise, a user may analyze drift data to determine whether to update a particular process model and/or when to update the model within an update schedule. Thus, a user may provide a user input to trigger a command or alert regarding a particular update operation for a respective process model. In some embodiments, update operations are automatically determined by a model drift manager using drift data obtained over a model management network (e.g., 100).

Keeping with FIG. 1, some embodiments are implemented in various types of industrial plants with different types of plant operations. Examples of plants may include a refinery, a gas processing plant, a gas cycling plant, a compressor plant, and a gas-oil separation plant. However, various non-petrochemical plants are also contemplated, such as manufacturing plants, other types of chemical plants, and other facilities that use process models for administering various processes. With respect to control systems, control systems may include a programmable logic controller (PLC), a distributed control system (DCS), a supervisory control and data acquisition (SCADA), and/or a remote terminal unit (RTU). For example, a programmable logic controller may control valve states, fluid levels, pipe pressures, warning alarms, and/or pressure releases throughout a plant facility. In particular, a programmable logic controller may be a ruggedized computer system with functionality to withstand vibrations, extreme temperatures, wet conditions, and/or dusty conditions, for example, around a refinery. A distributed control system may be a computer system for managing various processes at a plant facility using multiple control loops. As such, a distributed control system may include various autonomous controllers (such as remote terminal units) positioned at different locations throughout the facility to manage operations and monitor processes. Likewise, a distributed control system may include no single centralized computer for managing control loops and other operations. On the other hand, a SCADA system may include a control system that includes functionality for enabling monitoring and issuing of process commands through local control at a facility as well as remote control outside the facility. With respect to an RTU, an RTU may include hardware and/or software, such as a microprocessor, that connects sensors and/or actuators using network connections to perform various processes in the automation system.

Keeping with control systems, a control system may be coupled to facility equipment. Facility equipment may include various machinery such as one or more hardware components that may be monitored using one or more sensors. Examples of hardware components coupled to a control system may include crude oil preheaters, heat exchangers, pumps, valves, compressors, loading racks, and storage tanks among various other types of hardware components. Hardware components may also include various network elements or control elements for implementing control systems, such as switches, routers, hubs, PLCs, access points, remote terminal units, user equipment, or any other technical components for performing specialized processes. Examples of sensors may include pressure sensors, torque sensors, rotary switches, weight sensors, position sensors, microswitches, hydrophones, accelerometers, etc. A model drift manager, user devices, drift analyzers, and network elements may be computer systems similar to the computer system (602) described in FIG. 6 and the accompanying description.

In some embodiments, a user device (e.g., user device M (130)) may communicate with a model drift manager to adjust dynamically different drift analyses (e.g., based on different drift indicators and/or different simulation scenarios) based on one or more user selections (e.g., user selections N (131)). The user device may be a personal computer, a handheld computer device such as a smartphone or personal digital assistant, or a human machine interface (HMI). For example, a user may interact with a user interface (e.g., user interface O (132)) to change KPIs, drift indicators, weights on different drift data, etc., for a particular process model. Through user selections or automation, the model drift manager may provide model status reports (e.g., model status reports A (151)) in response to a request for status report (133)) and other information in a graphical user interface regarding drift data and process models. As such, a gas supply manager may provide agility and flexibility in determining and modifying production scenarios.

In some embodiments, an update schedule is generated by a model drift manager upon obtaining a request (e.g., request to update model (134)) from a user device. The request may be a network message transmitted between a user device and a model drift manager. In some embodiments, the model drift manager includes functionality for transmitting commands (e.g., update command Z (143)) to one or more user devices and/or control systems to implement a particular update operation. For example, the model drift manager X (150) may transmit a network message over a machine-to-machine protocol to the refinery system C (190) or gas plant system B (180) or one or more of control systems A (176) in GOSP plant A (170). A command may be transmitted periodically, based on a user input, or automatically based on changes in drift data.

While FIG. 1 shows various configurations of components, other configurations may be used without departing from the scope of the disclosure. For example, various components in FIG. 1 may be combined to create a single component. As another example, the functionality performed by a single component may be performed by two or more components.

Figure 2:
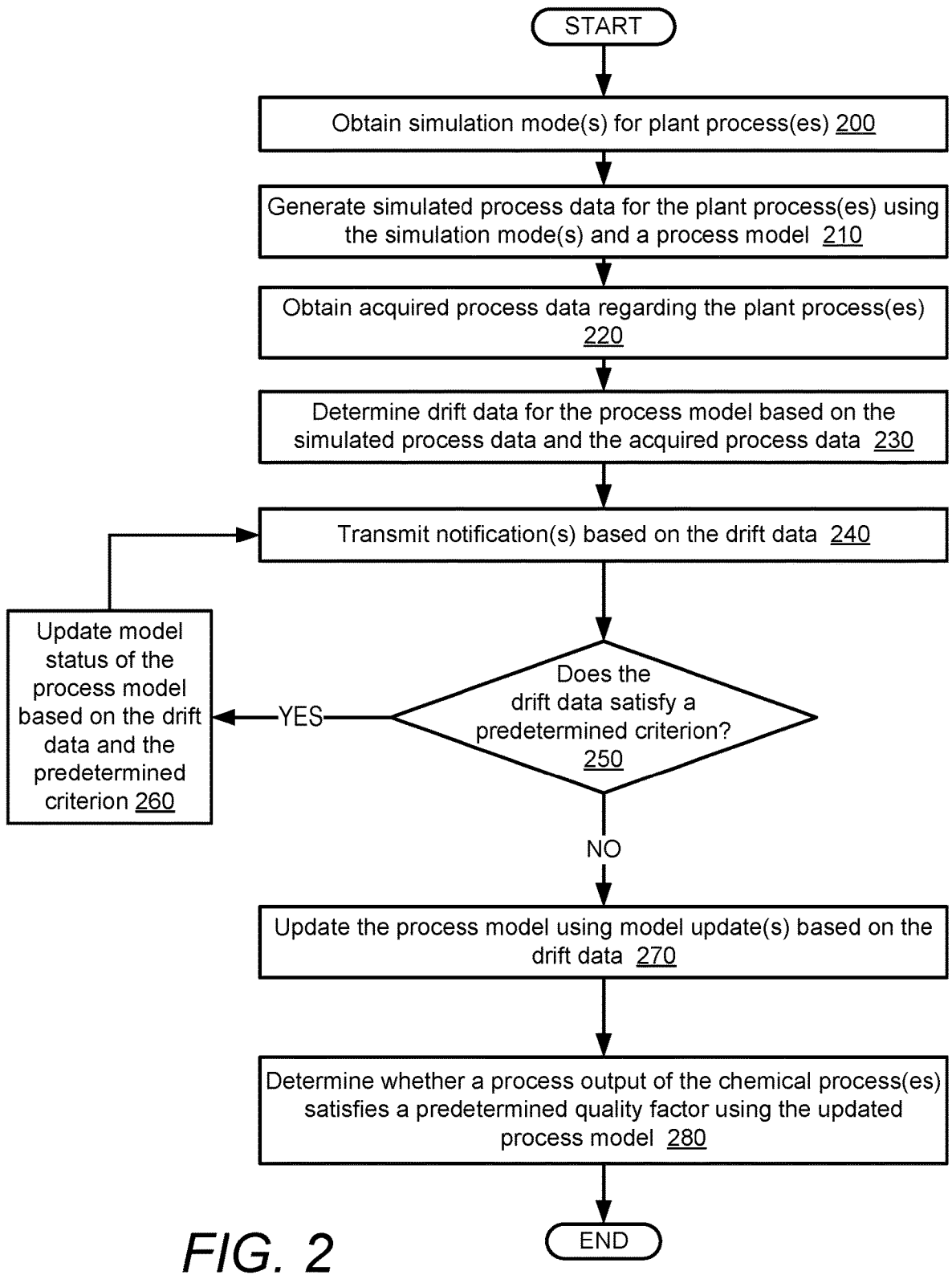
FIG. 2 shows a flowchart in accordance with one or more embodiments.

Turning to FIG. 2, FIG. 2 shows a flowchart in accordance with one or more embodiments. Specifically, FIG. 2 describes a general method for determining whether to update a process model based on drift data in accordance with one or more embodiments. One or more blocks in FIG. 2 may be performed by one or more components (e.g., model drift manager X (150)) as described in FIG. 1. While the various blocks in FIG. 2 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 200, one or more simulation modes are obtained for one or more plant processes in accordance with one or more embodiments. For example, a plant process may include a range of possible inputs under different plant conditions (e.g., humidity levels, temperature levels, using different types of plant equipment, etc.) that may affect a particular output of the plant process. Thus, simulation modes may be automatically selected by a model drift manager or a drift analyzer to illustrate various possible plant scenarios. Likewise, a user device may choose a selection of one or more simulation modes for simulating different plant scenarios.

In Block 210, simulated process data are generated for one or more plant processes using one or more simulation modes and a process model in accordance with one or more embodiments. In particular, different simulation scenarios may be used to model a particular plant process. The simulated process data may be the result of such simulations.

In Block 220, acquired process data are obtained regarding one or more plant processes in accordance with one or more embodiments. Acquired process data may correspond to both information collected for input process parameters and various process outputs. Because process models may deviate from actual plant data over time, acquired process data may be collected to monitor model drift. For example, acquired process data may be obtained from sensors in a plant facility, or laboratory experiments performed on outputs from the plant process (e.g., to determine chemical compositions of the process outputs). Likewise, acquired process data may also be obtained from plant equipment, user reports, automated reports, and ad-hoc tables. Thus, acquired process data may be obtained from different data sources that may be located at a plant facility or outside a plant facility (e.g., in the context of laboratory experiments on the process outputs).

In Block 230, drift data are determined for a process model based on simulated process data and acquired process data in accordance with one or more embodiments. In some embodiments, drift data provides a model quality metric that uses multiple drift indicators (e.g., a KPI based on a refinery's unit performance) to map individual drift indicators into an overall KPI. Thus, drift data may be used to determine whether plant data and simulated process data are matching within a predetermined margin of error. Drift data may be formulated to give an overall indication of the health of a process model based on various operating parameters measured from the plant data.

In Block 240, one or more notifications are transmitted based on drift data in accordance with one or more embodiments. Using drift data, one or more messages may be transmitted to a user device for a respective process model.

The message may be a simple notification that the process model's error margin is within acceptable levels. Likewise, when model drift fails to satisfy a predetermined criterion, such as a drift threshold, the notification may be transmitted to a user device or displayed within a graphical user interface alerting users that the process model may require an update. In some embodiments, notifications are based on predicted drift data. For example, a model drift manager may determine an expected date that a process model fails to satisfy a drift threshold, and transmit one or more notifications of the upcoming date accordingly. In some embodiments, a model drift manager transmits commands in place of one or more notifications to automate the update process.

In Block 250, a determination is made whether drift data satisfies a predetermined criterion in accordance with one or more embodiments. By obtaining drift data from different sources, a model drift manager may compare model outputs to previous simulation runs of a process model and acquired process data. In particular, the predetermined criterion may be a specified minimum difference, such as a drift threshold, that a process model should satisfy for continued use in plant processes. A predetermined criterion may correspond to a desired prediction accuracy (e.g., >95%). When an outdated process model has less than the desired prediction accuracy (e.g., <95%), the drift data fails the predetermined criterion. Likewise, different process models may have different predetermined criteria.

In some embodiments, a predetermined criterion is a relative value in comparison to other process models (e.g., a process model with the most model drift may fail to satisfy the predetermine criterion and be assigned a model update within an update schedule). The predetermined criterion may be a predetermined function based on the importance assigned to various plant process and/or a particular output of the plant process. If the difference between the model and plant fails to satisfy a predetermined criterion, then the process model may be flagged and an update workflow may be initiated accordingly. When a determination is made that the drift data satisfies a predetermined criterion, the process proceeds to Block 260. When a determination is made that the drift data fails to satisfy the predetermined criterion, the process may proceed to Block 270.

In some embodiments, periodic checks on model drift may extend the life of a process model. By reducing the duration time to detect model drift (e.g., from months to days), resources may be reduced on validating and retuning models for a given plant. Thus, some embodiments may allow fast and accurate update decisions regarding process models for different plant operations.

Figure 3:
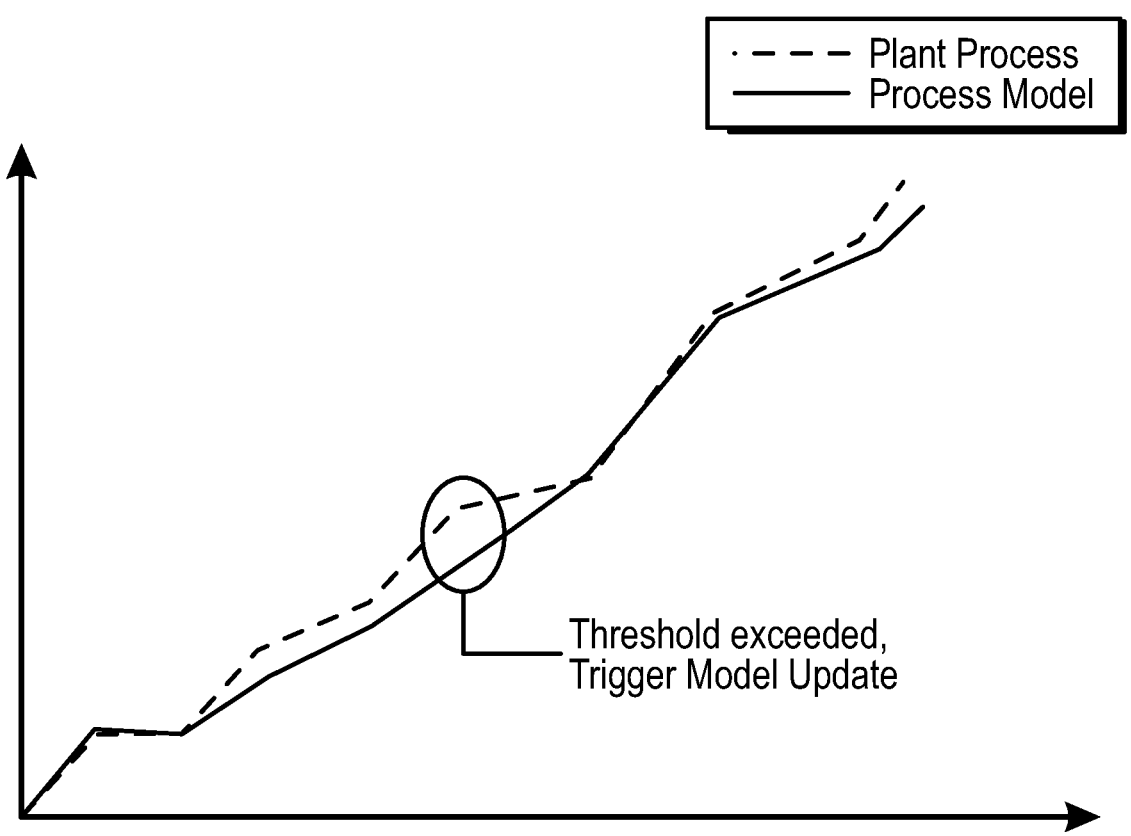
FIG. 3 shows an example in accordance with one or more embodiments.

Turning to FIG. 3, FIG. 3 shows an example of a drift analysis in accordance with one or more embodiments. In FIG. 3, one graph line illustrates simulated process data for a process model and a second graph line illustrates acquired process data for a respective plant process. As shown in FIG. 3, a drift threshold is exceeded by the simulated process data that triggers an update at an early stage. For example, drift data (not shown) may be the difference between the two graph lines. Thus, a drift analysis workflow may result in a fitted process model that continuously represents plant processes and operations.

Returning to FIG. 2, in Block 260, a model status of a process model is updated based on drift data and a predetermined criterion in accordance with one or more embodiments. In some embodiments, multiple statuses of different process models may be presented in a graphical user interface. A respective model status may be periodically update, e.g., based on drift data from one or more drift analyzers.

In Block 270, a process model is updated using one or more model updates based on drift data in accordance with one or more embodiments. In some embodiments, a model drift manager transmits a request to update a process model. For example, a process model may be retrained using a new training data set. Likewise, a user may analyze the process model and upload a revised model to a plant system. In some embodiments, the request to update the model is monitored. Thus, a model drift manager may reassign an update task to another entity, e.g., if a user device responds with a message refusing the request. Once a model update is obtained, the model update may be validated, e.g., using acquired process data. In some embodiments, a user device may determine that the process model does not require an update (e.g., other problems may exist that cause the model drift, such as malfunctioning plant equipment).

In Block 280, a determination is made whether a process output of one or more plant processes satisfies a predetermined quality factor using an updated process model in accordance with one or more embodiments. Once a process model is updated or returned to service, the process model may be used again to analyze outputs of various plant processes, e.g., in assessing quality factors of the plant processes.

Figure 4:
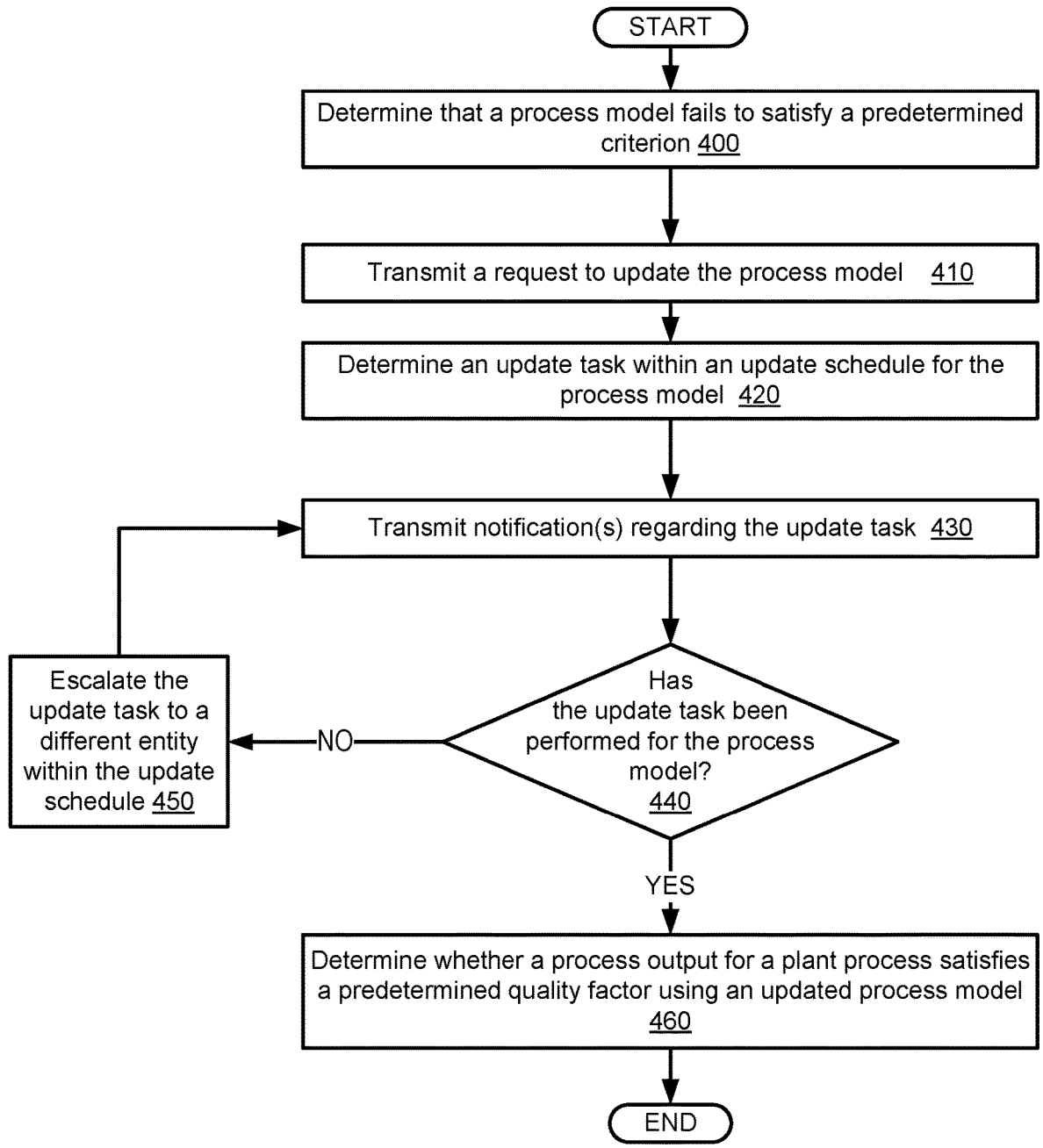
FIG. 4 shows a flowchart in accordance with one or more embodiments.

Turning to FIG. 4, FIG. 4 shows a flowchart in accordance with one or more embodiments. Specifically, FIG. 4 describes a general method for managing update tasks in accordance with one or more embodiments. One or more blocks in FIG. 4 may be performed by one or more components (e.g., model drift manager X (150)) as described in FIG. 1. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, a determination is made that a process model fails to satisfy a predetermined criterion in accordance with one or more embodiments. For example, Block 400 may be similar to Block 250 described above in FIG. 2 and the accompanying description. Once a process model fails a predetermined criterion, the process model may be sent to an update workflow.

In Block 410, a request is transmitted to update a process model in accordance with one or more embodiments. In some embodiments, one or more update requests are generated by a model drift manager in response to identifying a process model with unacceptable model drift. Update requests may correspond to different levels of escalation based on whether the process model receive a model update. For example, at an initial escalation level, an update task may be assigned a predetermined period of time to complete (e.g., one week). If the process model is not updated within the predetermined period of time, another update request is transmitted to a different escalation level (e.g., a different user or organization). Thus, an update task may be escalated to multiple levels depending on whether the task is competed. Moreover, a particular update task may be escalated to managerial attention for awareness of a model update issue.

In Block 420, an update task is determined within an update schedule for a process model in accordance with one or more embodiments. In some embodiments, multiple update tasks are assigned different priorities or scheduled completion dates in an update schedule. The update schedule may be similar to a queue, where one model update is assigned after the previous model update is completed. The update schedule may be based on drift data, or weighted for importance of a corresponding plant operation or process model.

In Block 430, one or more notifications are transmitted regarding an update task in accordance with one or more embodiments. For example, a user assigned to update a model may transmit a notification that the model update cannot be completed within a particular time frame (e.g., due to specific plant operations, the outdated process model cannot be taken offline). Likewise, a notification may also include an acknowledgment that a model update has been successfully completed.

In Block 440, a determination is made whether an update task has been performed for a process model in accordance with one or more embodiments. When a determination is made that the update task has been performed, the process proceeds to Block 460. When a determination is made that the update task has not been completed, the process may proceed to Block 450.

In Block 450, an update task is escalated to a different entity within an update schedule in accordance with one or more embodiments.

In Block 460, a determination is made whether a process output for a plant process satisfies a predetermined quality factor using an updated process model in accordance with one or more embodiments. For example, Block 460 may be similar to Block 280 described above in FIG. 2 and the accompanying description.

Figure 5:
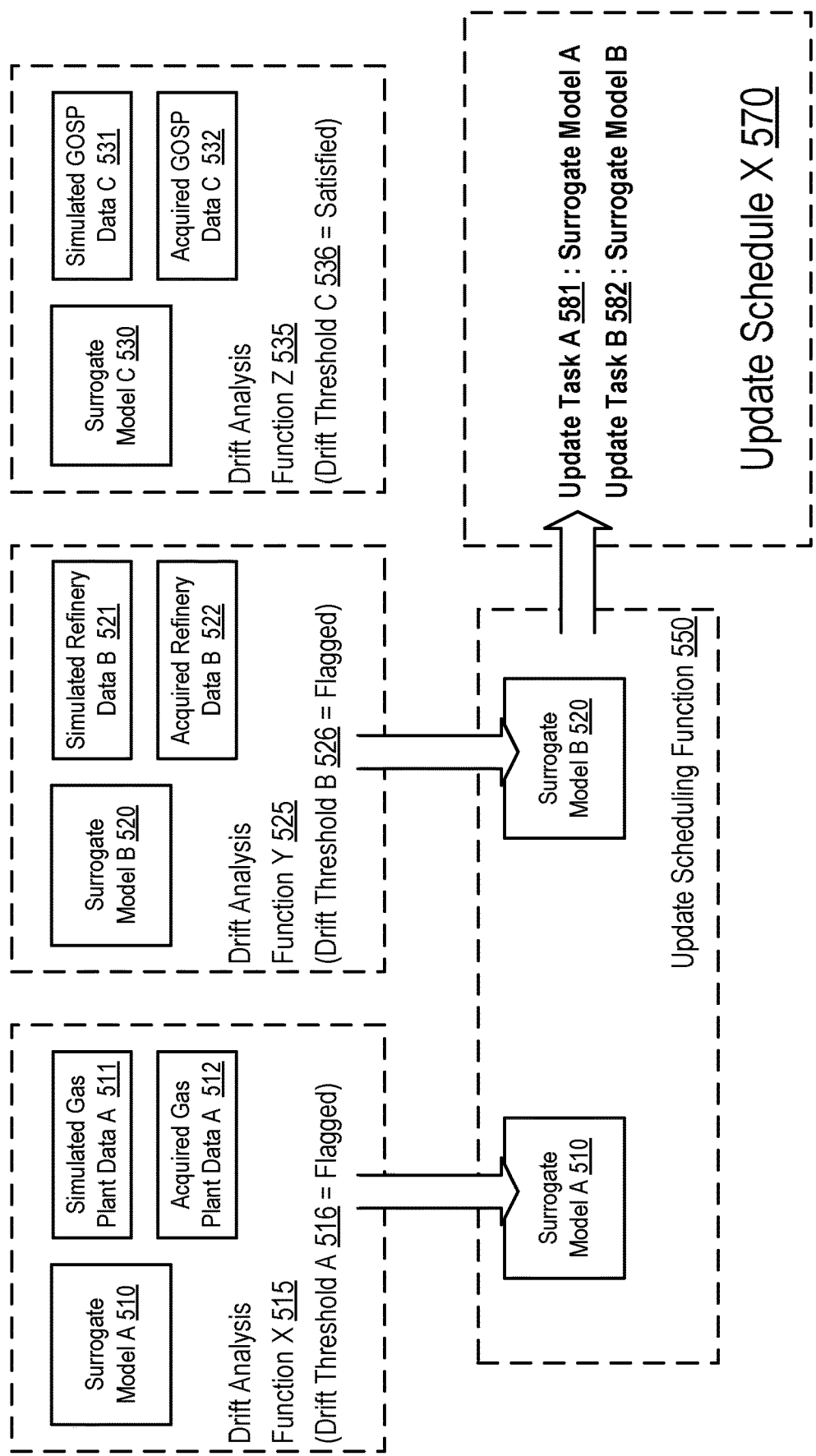
FIG. 5 shows an example in accordance with one or more embodiments.

Turning to FIG. 5, FIG. 5 provides an example of determining update tasks based on model drift in accordance with one or more embodiments. The following example is for explanatory purposes only and not intended to limit the scope of the disclosed technology. As shown in FIG. 5, various surrogate models are used for different plant processes, i.e., surrogate model A (510), surrogate model B (520), and surrogate model C (530). For surrogate model A (510), a drift analysis function X (515) is performed by a drift analyzer (not shown) to determine whether simulated gas plant data A (511) and acquired gas plant data A (512) satisfy drift threshold A (516). After performing the drift analysis, the drift analyzer flags the surrogate model A (510) as requiring a model update. The surrogate model A (510) is thus sent to an update scheduling function (550).

For surrogate model B (520), a drift analysis function Y (525) is performed by a drift analyzer (not shown) to determine whether simulated refinery data B (521) and acquired refinery data B (522) satisfy drift threshold B (526). After performing the drift analysis, the drift analyzer flags the surrogate model B (520) as requiring a model update. The surrogate model B (520) is thus sent to an update scheduling function (550).

Keeping with FIG. 5, for surrogate model C (530), a drift analysis function Z (535) is performed by a drift analyzer (not shown) to determine whether simulated gas-oil separation plant (GOSP) data C (531) and acquired GOSP data C (532) satisfies drift threshold C (536). After performing the drift analysis, the drift analyzer determines that the surrogate model C (530) satisfies the drift threshold C (536) and no model update is required.

After receiving notifications that surrogate model A (510) and surrogate model B (520) require model updates, an update scheduling function (550) generates two update tasks, i.e., update task A (581) for updating surrogate model A (510), and update task B (582) for updating surrogate model B (520) within an update schedule X (570). For example, the update scheduling function may be performed by a model drift manager.

Figure 6:
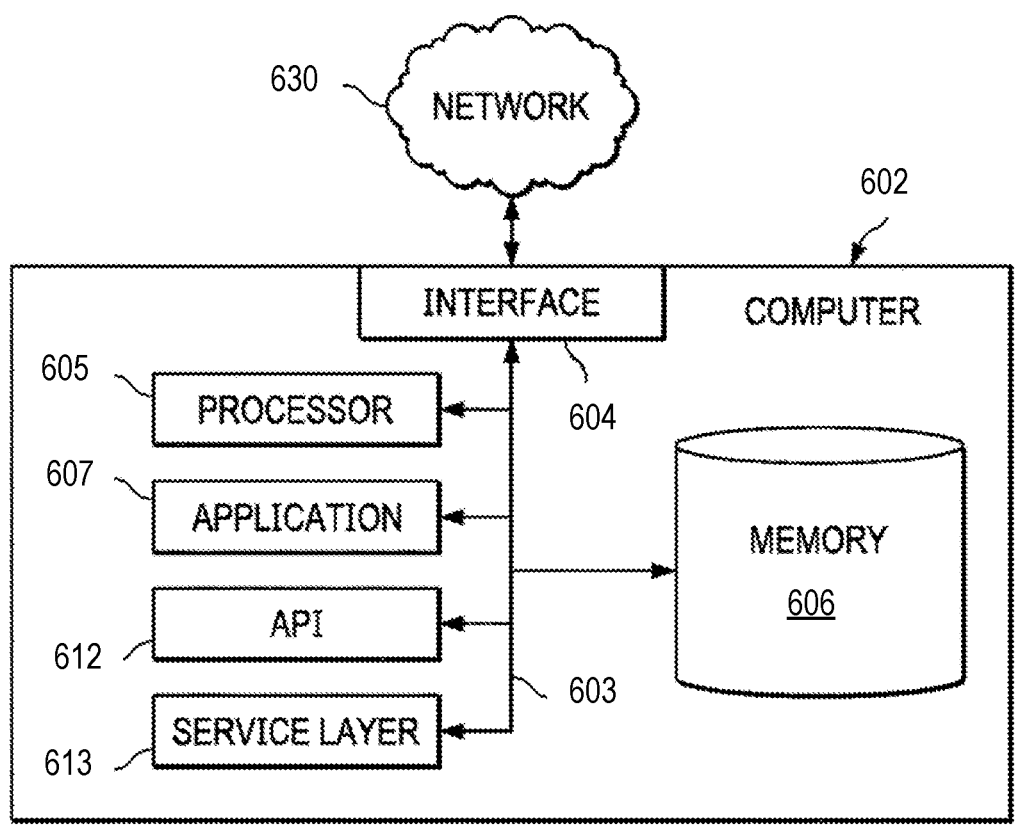
FIG. 6 shows a computer system in accordance with one or more embodiments.

Embodiments may be implemented on a computer system. FIG. 6 is a block diagram of a computer system (602) used to provide computational functionalities associated with described algorithms, methods, functions, processes, flows, and procedures as described in the instant disclosure, according to an implementation. The illustrated computer (602) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a GUI.

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the said requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or other suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604 includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), each computer (602) communicating over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

In some embodiments, the computer (602) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:
1. A method, comprising:
obtaining, by a computer processor, first acquired process data regarding a first plant process that is performed by a plant system;
obtaining, by the computer processor and from a first process model, first simulated process data regarding the first plant process,
wherein the first process model is a surrogate model that numerically approximates the first plant process using black-box modelling;
determining, by the computer processor, first drift data for the first process model based on a difference between the first acquired process data and the first simulated process data, wherein the first drift data corresponds to an amount of model drift associated with the first process model;
determining, by the computer processor, whether the first drift data satisfies a first predetermined criterion;
determining, by the computer processor and in response to determining that the first drift data fails to satisfy the first predetermined criterion, a model update for the first process model;
obtaining, by the computer processor, aggregated drift data from a plurality of plant systems for a plurality of process models, wherein the aggregated drift data comprises the first drift data and the plurality of process models comprises the first process model;
determining, by the computer processor, an update schedule for the plurality of process models using the aggregated drift data;
transmitting, by the computer processor and automatically based on the update schedule and in response to determining the model update, a plurality of update commands to the plurality of plant systems,
wherein the plurality of update commands comprises a first request to a first plant system among the plurality of plant systems for updating the first process model using the model update; and
updating, by the first plant system, the first process model using the model update in response to receiving the first request.

2. The method of claim 1, further comprising:
obtaining, by the computer processor, second drift data regarding a second process model and third drift data regarding a third process model;
determining, by the computer processor, a plurality of model statuses using the second drift data and the third drift data; and
presenting, by the computer processor, the plurality of model statuses within a graphical user interface.

3. The method of claim 1,
wherein the first acquired process data corresponds to a plurality of inputs to the first plant process and at least one output of the first plant process.

4. The method of claim 1,
wherein the first process model generates the first simulated process data based on one or more predetermined simulation modes for the first plant process, and
wherein the one or more predetermined simulation modes correspond to a plurality of equipment parameters and a plurality of input parameters for performing the first plant process.

5. The method of claim 1, further comprising:
obtaining, by a drift analyzer coupled to a second process model, second acquired process data and second simulated process data regarding a second plant process, wherein the second acquired process data corresponds to a plurality of outputs by the second plant process; and
determining, by the drift analyzer and using the second acquired process data and the second simulated process data, second drift data based on a key performance indicator of the second plant process,
wherein the second drift data is used to determine whether the second process model satisfies a second predetermined criterion.

6. The method of claim 1,
wherein the model update corresponds to a retraining operation using a machine-learning algorithm for the first process model.

7. The method of claim 1,
wherein the first process model is an artificial neural network.

8. The method of claim 1,
wherein the first predetermined criterion is a drift threshold.

9. The method of claim 1,
wherein the first plant process is a petro-chemical process for a refining operation.

10. A system, comprising:
a first user device;
a plurality of plant systems comprising a first plant system, the first plant system comprising a first process model and first plant equipment,
wherein the first process model is a surrogate model that numerically approximates a first plant process using black-box modelling; and
a model drift manager comprising a computer processor and coupled to the plurality of plant systems and the first user device, wherein the model drift manager comprises functionality for:
obtaining first acquired process data regarding a first plant process that is performed by the first plant system;
obtaining, from the first process model, first simulated process data regarding the first plant process;
determining first drift data for the first process model based on a difference between the first acquired process data and the first simulated process data;
determining whether the first drift data satisfies a first predetermined criterion;
determining, in response to determining that the first drift data fails to satisfy the first predetermined criterion, a model update for the first process model;
obtaining aggregated drift data from a plurality of plant systems for a plurality of process models,
wherein the aggregated drift data comprises the first drift data and the plurality of process models comprises the first process model;
determining an update schedule for the plurality of process models using the aggregated drift data; and
transmitting, automatically based on the update schedule and in response to determining the model update, a plurality of update commands to the plurality of plant systems,
wherein the plurality of update commands comprises a first request to a first plant system among the plurality of plant systems for updating the first process model using the model update, and
wherein the first plant system updates the first process model using the model update in response to receiving the first request.

11. The system of claim 10, further comprising:
a second plant system comprising a second process model and second plant equipment; and
a drift analyzer coupled to the second process model,
wherein the drift analyzer determines second drift data based on a key performance indicator of a second plant process using second acquired process data and second simulated process data, and
wherein the second drift data is used to determine whether the second process model satisfies a second predetermined criterion.

12. The system of claim 10, wherein the model drift manager further comprises functionality for:
obtaining second drift data regarding a second process model and third drift data regarding a third process model;
determining a plurality of model statuses using the second drift data and the third drift data; and
presenting, by the first user device, the plurality of model statuses within a graphical user interface.

13. The system of claim 10, wherein the model drift manager further comprises functionality for:
transmitting, in response to determining that the first process model has not been updated within a predetermined period of time, a second request to a second user device to update the first process model, wherein the first request is based on a first escalation level, and wherein the second request is based on a second escalation level.

14. The system of claim 10, wherein the first process model is an artificial neural network, wherein the first predetermined criterion is a drift threshold, and wherein the first plant process is a petro-chemical process for a refining operation.

* * * * *